Patented Feb. 7, 1933

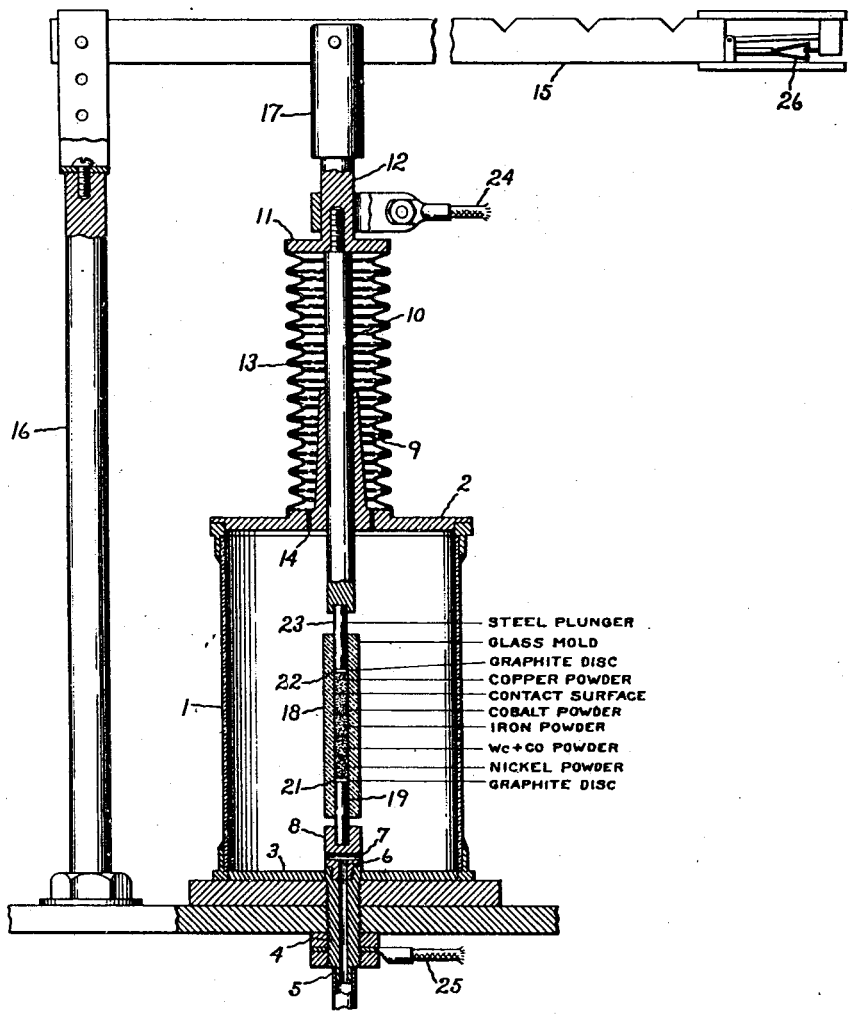

1,896,853

UNITED STATES PATENT OFFICE

GEORGE F. TAYLOR, OF NISKAYUNA, NEW YORK, ASSIGNOR TO GENERAL ELECTRIC COMPANY, A CORPORATION OF NEW YORK

WELDING PROCESS

Application filed September 22, 1930. Serial No. 483,525.

The present invention relates to a welding process. Heretofore in welding operations the structures to be welded together have generally been solid or cast structures, although it has been found desirable under certain conditions to weld a structure which is in powdered form to a solid structure. For example, it is well known to weld powdered copper to a tungsten plate so as to form an X-ray target. The junction of two metal structures welded by the above processes is not always entirely satisfactory since the welded structures often do not penetrate to an appreciable extent into one another to thereby form a strong and rigid weld. For example, there is often a sharp line of demarcation between the welded structures.

It is an object of the present invention to provide an improved method for welding two metal structures in which each structure always penetrates or dovetails into the other to an appreciable extent to thereby form a very rigid and strong junction between the structures.

The novel features which are characteristic of my invention are set forth with particularity in the appended claims. The invention itself, however, will best be understood from reference to the following specification when considered in connection with the accompanying drawing in which the single figure represents a view partly in section and partly in elevation of an apparatus whereby my invention may be carried into effect. The apparatus disclosed on the drawing is substantially identical with that disclosed in my copending application Serial No. 462,368, filed June 19, 1930, entitled "Methods and apparatus for making hard metal compositions."

Referring to the drawing, I have indicated at 1 a receptacle having a removable cover or closure member 2 and a base portion 3. Extending through the latter is a screw-thread plug 4 provided with a central opening 5 therethrough. The latter opening connects with passageways 6 and 7 in an extension 8 mounted on the upper end of the plug 4.

The closure member 2 has a central upwardly extending guide portion 9 within which a movable rod or plunger 10 is mounted. The rod 10 carries at its upper end a flat metal plate 11 provided with an upwardly extending portion 12. Plate 11 is of smaller diameter than closure member 2 and is connected to the latter by means of a corrugated flexible member 13 commonly known as a sylphon bellows. The portion of the member 2 which separates the interior of the sylphon bellows from the interior of receptacle 1 is perforated with a series of holes 14 whereby the pressure within the sylphon bellows and receptacle 1 may be equalized.

Pressure may be applied to the plate 11 and the plunger 10 by means of a lever 15 pivoted to a standard 16 and provided with a depending portion 17, the latter in turn pivoted to lever 15 and adapted to engage the upwardly extending portion 12 on plate 11. A weight, not shown, may be positioned at any point along lever 15 in order to apply any desired pressure to the plate 11.

In carrying out my invention, I employ a refractory, electrically non-conducting mold 18 which may be made for example of hard glass. A steel or other suitable plunger 19 is inserted in one end of the mold and a thin graphite disc or layer of carbon 21 placed on the inner end of the plunger. Successive powdered layers or sections of the metals to be welded together are superimposed upon one another in the mold 18. Each successive section is levelled by means of a flat-ended rod which may be pressed against the upper surface of the powdered material. I have indicated on the drawing for illustration purposes successive sections of nickel, a composition of tungsten-carbide and cobalt, iron, cobalt, and copper. On the upper surface of the copper I place a second graphite disc 22. A steel or other suitable plunger 23 is then inserted in the upper end of the mold 18 and the loaded mold and plungers positioned in the container 1 between the extension 8 and plunger 10. The container 1 is then flushed out with hydrogen gas supplied through the plug 4 and finally evacuated by means of a vacuum pump, not shown, which is connected to the plug 4 as in my copending application, Serial No. 462,368.

When the desired degree of vacuum is obtained, an electric circuit is completed through the sections of powdered materials and conductors 24 and 25 to thereby heat the powdered materials in mold 18 to their sintering temperatures. The powdered materials in the mold have a relatively high resistance but as the powdered composition comprising each section is heated to its sintering temperature plunger 10 descends slightly and compresses it into a solid mass. The section having the highest resistance is first compressed into a solid compact ingot. This compressed solid mass has an electrical resistance which is far lower than the original resistance of the powdered mass from which it is formed. As soon as one section has been compressed into a sintered solid mass, the quantity of heat received by that section is automatically reduced, due to the lowered resistance of the section and it begins to lose heat through radiation and conduction into the walls of the mold. The section of metal next highest in the order of resistance goes through the same cycle and this is followed by the other sections of powdered materials each in the order of its resistance until the lowest resistance section has been compressed when all the original sections of powdered or finely divided material will be found to be compressed into a solid mass, each section being securely welded to the sections of metal adjacent to it.

Heating current is supplied to the powdered material in the mold 18 for a very short period of time, for example from a fraction of a second to a few seconds. Since the mold is non-conducting it remains comparatively cool and very high pressures may be applied to the powdered material without causing breakage of the mold.

With my improved method, it is possible to unite two metals or compositions having widely different melting temperatures, and to obtain a rigid and unusually strong junction of the metals due to the fact that the powdered materials when heated to their sintering temperature and subjected to pressure penetrate an appreciable distance into the adjacent powdered material so that a thorough intermingling or dovetailing of the adjacent metals is secured thereby forming a strong tough junction of the metal structures.

While I have described my invention in connection with the welding of certain specified powdered materials, it will be understood that the invention is not limited to those materials. Other powdered metals could be employed if desired. Also, I might weld a lesser number of metals, for example two or a greater number than that shown in the present application.

If desired, I may employ an inertia switch 26 as in my copending application Serial No. 462,368 to maintain the flow of electric current through the pressed materials for a predetermined time after the sintering operation has taken place.

While I have found it advantageous to apply additional pressure to the powdered materials by means of the pivoted lever 15, the use of the lever 15 is not absolutely essential and it may be omitted if the atmospheric pressure is found to be sufficient to compact the powdered sections to the desired extent.

What I claim as new and desire to secure by Letters Patent of the United States, is:

1. The method of welding together two metal structures having different melting points which comprises superimposing said structures in powdered form one upon the other, applying pressure thereto and simultaneously pressing and sintering each of said compositions.

2. The method of joining two dissimilar metal structures which comprises superimposing said structures in powdered form one upon the other in an electrically non-conducting mold, applying pressure to said powdered materials and simultaneously completing an electrical circuit through said powdered materials to heat each of said materials to its sintering temperature.

3. The method of joining two metal structures having different melting points which comprises superimposing said structures in powdered form one upon the other in an electrically non-conducting mold, applying pressure to said powdered materials in a vacuum and simultaneously completing an electrical circuit through said powdered materials to heat each of said materials to its sintering temperature.

4. The method of joining a plurality of dissimilar metal structures which comprises superimposing said structures in powdered form one upon the other in an electrically non-conducting mold, placing said mold and powdered material in an environment which is inert with respect to powdered material and simultaneously completing an electrical circuit through said powdered materials to heat said materials to their sintering temperature.

5. The method of welding together two dissimilar metal structures which comprises positioning said structures, each in finely divided condition, in a mold and in abutting contact with one another and applying pressure to the finely divided materials while they are heated at an elevated temperature.

6. The method of welding together two dissimilar metal structures which comprises placing one of said structures in finely divided condition in a mold, placing the other structures also in finely divided condition adjacent to and in contact with the first mentioned finely divided material and applying pressure to said finely divided materials while they are heated at an elevated temperature to thereby form each of said structures into a solid mass welded to the adjacent mass.

In witness whereof, I have hereunto set my hand this 20th day of September, 1930.

GEORGE F. TAYLOR.